United States Patent
Sugama et al.

(10) Patent No.: US 6,931,168 B2
(45) Date of Patent: Aug. 16, 2005

(54) OPTICAL SWITCH AND OPTICAL SWITCH MODULE

(75) Inventors: Akio Sugama, Kawasaki (JP); Masayuki Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 10/420,760

(22) Filed: Apr. 23, 2003

(65) Prior Publication Data

US 2003/0235362 A1 Dec. 25, 2003

(30) Foreign Application Priority Data

Jun. 19, 2002 (JP) ........................................ 2002-178291

(51) Int. Cl.⁷ ................................................ G02B 6/10
(52) U.S. Cl. ........................ 385/16; 385/15; 385/17; 385/14; 385/33; 385/129; 385/130
(58) Field of Search ............................... 385/14, 15, 16, 385/17, 18, 39, 40, 8, 9, 10, 33, 129, 130, 131

(56) References Cited

U.S. PATENT DOCUMENTS

| | | | | |
|---|---|---|---|---|
| 4,693,548 A | * | 9/1987 | Tsunoi ........................ 347/244 |
| 5,093,874 A | * | 3/1992 | Hawkins et al. ................ 385/8 |
| 5,144,603 A | * | 9/1992 | Mozume et al. ..... 343/700 MS |
| 5,327,512 A | * | 7/1994 | Penner et al. ................... 385/3 |
| 5,371,817 A | * | 12/1994 | Revelli et al. ................ 385/44 |
| 6,823,097 B2 | * | 11/2004 | Glebov et al. ................ 385/16 |
| 2003/0202732 A1 | * | 10/2003 | Glebov et al. ................ 385/16 |
| 2003/0235362 A1 | * | 12/2003 | Sugama et al. ................ 325/16 |

OTHER PUBLICATIONS

Patent Abstracts of Japan, Publication No. 2000–241836, dated Sep. 8, 2000.

* cited by examiner

*Primary Examiner*—Brian M. Healy
(74) *Attorney, Agent, or Firm*—Armsrtong, Kratz, Quintos, Hanson & Brooks, LLP

(57) ABSTRACT

An optical switch is arranged to have so simple a structure that the switch may be reduced in size. The optical switch includes an input waveguide for accepting an optical signal inputted from the outside, a plurality of output waveguides for outputting the optical signals to the outside, a collimate lens for collimating the optical signal passed through the input waveguide, an optical deflector element for switching the propagating direction of the collimated optical signal, a common waveguide through which the optical signal passed through the optical deflector element is propagated, and a light-condensing portion having a plurality of light-condensing lenses integrally formed therein, each of those lenses serving to image the optical signal inputted from the optical deflector element through the common waveguide onto each output waveguide.

10 Claims, 11 Drawing Sheets

OPTICAL SWITCH AND OPTICAL SWITCH MODULE

CROSS-REFERENCE TO RELATED APPLICATIONS

This application is based upon and claims priority of Japanese Patent Application No. 2002-178291, filed on Jun. 19, 2002, the contents being incorporated herein by reference.

BACKGROUND OF THE INVENTION (1) Field of the Invention

The present invention relates to an optical switch and an optical switch module that are arranged to switch a propagation path of an optical signal.

(2) Description of the Related Art

An optical signal is preferable in transmitting a signal at fast speed and in large capacity. For a long-distance trunk communication system, transmission of an optical signal has been already realized for practical use. This kind of system is essentially required to have a function of switching a transmission path of an optical signal.

Traditionally, the switch of a transmission path of an optical signal has taken the steps of temporarily converting an optical signal into an electric signal, causing a semiconductor switch to switch to a signal destination, and then re-converting the electric signal into the optical signal. However, since transmission of a signal is made faster and faster, the transmission speed surpasses the speed of an electric switching system arranged through the use of a semiconductor switch.

Under these circumstances, a new optical switch has been developed which is arranged to switch a transmission path without converting an optical switch into an electric signal. For realizing this type of optical switch, several types of systems have been proposed. Of these systems, for example, a great concern is placed on an optical switch arranged to have an optical deflector element that provides a fast switching operation. The optical deflector element is composed so that crystals having an electrooptical effect, that is, the refractive index of which crystals is varied by an electric field, are used for composing a light waveguide (simply referred to as a waveguide) and a prism electrode is formed on the upper and the lower portions of the waveguide. The electrodes are excited to apply a voltage onto the waveguide so that an optical signal propagating through the waveguide may be deflected.

FIG. 11 is an illustration showing an exemplary arrangement of the conventional optical switch arranged to have an optical deflector element.

In FIG. 11, the optical switch 800 is arranged to have three input channels and four output channels. This optical switch 800 is arranged to have a waveguide input portion 810, a collimating portion 820, an input side optical deflector element portion 830, a common waveguide 840, an output side optical deflector element portion 850, a light-condensing portion 860, and a waveguide output portion 870. In this optical switch 800, for example, the waveguide input portion 810, the collimating portion 820, the common waveguide 840, the light-condensing portion 860, and the waveguide output portion 870 are integrally formed on the substrate, on which are mounted the input side optical deflector element portion 830 and the output side optical deflector element portion 850.

The waveguide input portion 810 includes input waveguides 811, 812 and 813 formed for three input channels, to which an optical signal enters. Likewise, the waveguide output portion 870 includes output waveguides 871, 872, 873 and 874 formed for four output channels, from which the optical signal outgoes.

The collimating portion 820 is composed of collimate lenses 821, 822 and 823 that correspond with the input waveguides 811 to 813 respectively. Each of the collimate lenses 821 to 823 is served to convert the rays outgoing radially from the input waveguides 821 to 823 into parallel rays and then inputs the parallel rays into the input side optical deflector element portion 830.

The input side optical deflector element portion 830 provides optical deflector elements 831, 832 and 833 for the input channels. In each of the optical deflector elements 831 to 833, two prism electrodes 831a and 831b served as a lower electrode and a conductive substrate (not shown) served as an upper electrode apply a voltage onto a slab waveguide (not shown) composed of a material having an electrooptical effect. The applied voltage causes the refractive index inside the slab waveguide to be varied and then the propagating direction of the incoming optical signal to be changed.

The common waveguide 840 is composed of a slab waveguide and serves to convey the rays passed through the optical deflector element portion 830 on the input side into the optical deflector element portion 850 on the output side.

The output side deflector element portion 850 includes optical deflector elements 851, 852, 853 and 854 that correspond with the output channels respectively. Each of the optical deflector elements 851 to 854 has the same structure as each of the optical deflector elements 831 to 833. The optical deflector element causes the propagating direction of the rays entered from the input side optical deflector element portion 830 through the common waveguide 840 to be changed, so that the resulting rays may be entered into the light-condensing lenses 861, 862, 863 and 864.

The light-condensing portion 860 includes four light-condensing lenses 861 to 864 that correspond with the output waveguides 871 to 874 included in the waveguide output portion 870 respectively. The light-condensing lenses 861 to 864 are served to condense the rays passing through the corresponding light deflector elements 851 to 854 included in the optical deflector element output portion 850 and then to guide the condensed rays into the corresponding output waveguides 871 to 874 of the waveguide output portion 870.

The optical switch 800 arranged as described above enables to switchably put the optical signal entered from each input channel into any one of the output channels by controlling the voltage applied onto each optical deflector element included in the optical deflector element input portion 830 and the optical deflector element output portion 850. Further, each optical deflector element can be used at a time in the optical deflector element input portion 830 and the optical deflector element output portion 850. Hence, the optical signals inputted into three input channels at a time are allowed to be conveyed into any one of the output channels.

However, the foregoing conventional optical switch is required to have the same number of optical deflector elements as the channel number at the input and the output sides of the optical signal. Likewise, it is also required to have the same number of independently-formed collimate lenses or light-condensing lenses as the input or the output channel number. As is understood from these requirements, the conventional optical switch has so complicated a structure that its manufacturing cost may not be suppressed so much.

Moreover, as the input and output channels are increasing in number, the request for reducing the optical switch in size is on the rise. If more channels are provided, for reducing the conveying length of an optical signal, it is necessary to enlarge an angle of deflection of the optical deflector element portion. For this purpose, it is necessary to raise a voltage to be applied in the optical deflector element portion or use a material with a refractive index greatly changed when the voltage is applied, which results in raising the power consumption or the manufacturing cost.

In a case that the optical switch arranged as described above provides an arrangement of one input to n output channels (1×n channels), the optical switch may be used for switching a plurality of optical signals on the input side into the signals on the output side at a batch. Herein, the terms of "switching . . . at a batch" means that n combinations of waveguides each having m output channels for m input channels are prepared so that the optical signals of m input channels may be outputted to any one of the waveguides at a batch.

For realizing this type of conversion at a batch, it is necessary to range only m optical switches each having one input and n output channels in parallel and, at a later stage, rearrange the output waveguides of each optical switch into n combinations of waveguides. Hence, this disadvantageously makes the overall length of the waveguides longer and the structure of the optical switch more complicated.

SUMMARY OF THE INVENTION

The present invention is made in order to overcome these disadvantages. It is an object of the present invention to provide an optical switch which may be structured simply and reduced in size.

In carrying out the object, an optical switch is provided for switching a propagation path of an optical signal. This optical switch includes an input waveguide for accepting an optical input signal from the outside, a plurality of output waveguides for outputting an optical signal to the outside, a collimate portion for collimating the optical signal passing through the input waveguide, an optical deflector element for switching a propagating direction of the optical signal passing through the collimate portion, a common waveguide for propagating the optical signal passing through the optical deflector element, and a light-condensing portion having a plurality of light-condensing lenses integrally formed therein, each of the light-condensing lenses being served to image the optical signal passing through the common waveguide onto each of the optical waveguides.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereafter, the embodiments of the present invention will be described with reference to the appended drawings.

Figure 1:
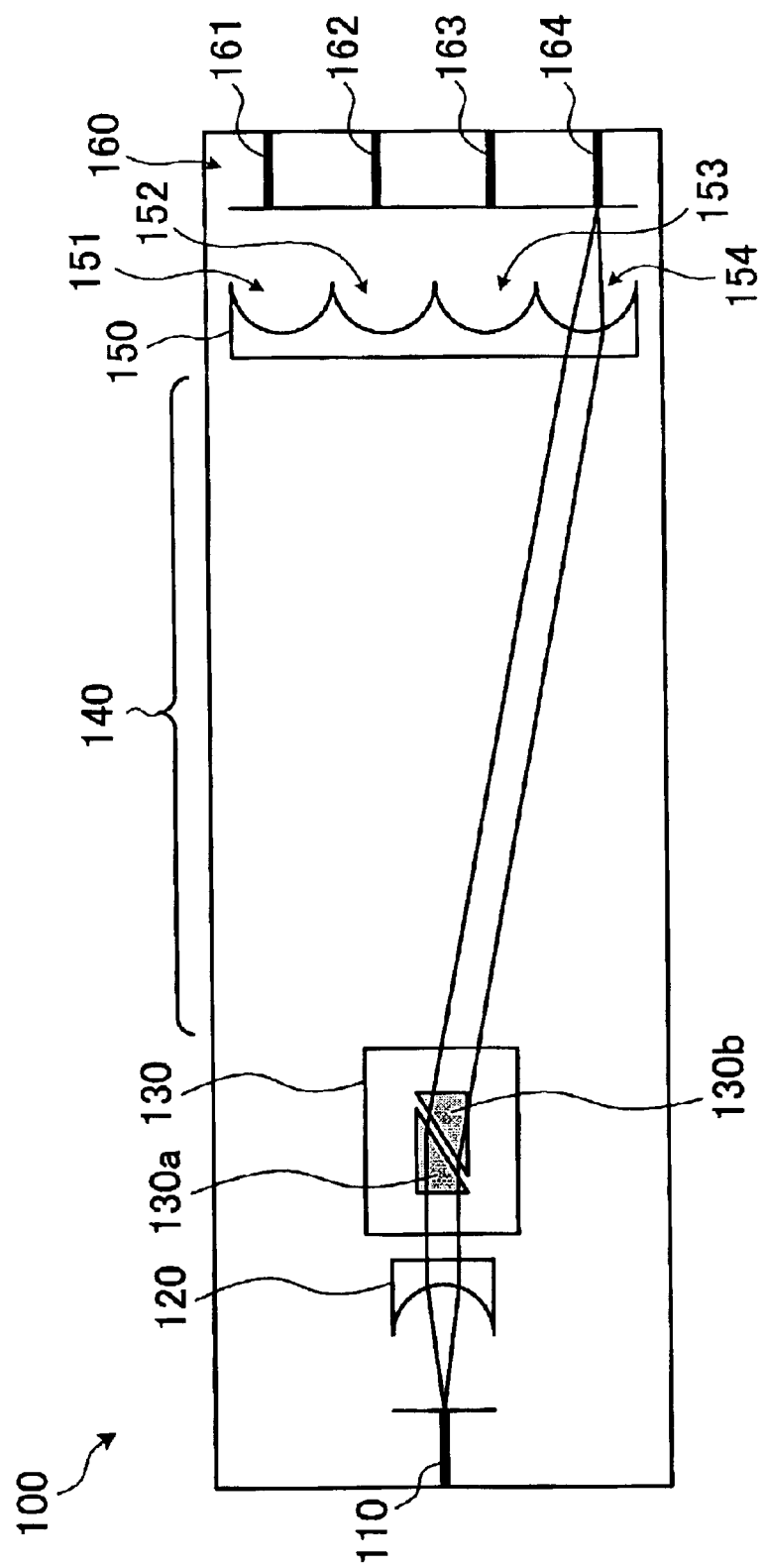
FIG. 1 is a plan view showing an overall arrangement of an optical switch according to a first embodiment of the present invention.

FIG. 1 is a plan view showing an overall arrangement of an optical switch according to a first embodiment of the present invention.

An optical switch 100 shown in FIG. 1 switchably puts an optical signal of one input channel into a plurality of output channels. In FIG. 1, the optical switch 100 is arranged to have one input channel and four output channels as an example.

The optical switch 100 is arranged to have an optical input waveguide 110, a collimate lens 120, an optical deflector element 130, a common waveguide 140, a light-condensing portion 150, and an output waveguide portion 160.

The input waveguide 110 is connected with, for example, an optical fiber on the entrance side so that an optical signal may be entered from the outside to the waveguide 110. Further, the output waveguide portion 160 includes a plurality of output waveguides 161, 162, 163 and 164 formed in a manner to correspond with the output channels respectively so that each of the output waveguides 161 to 164 may output the optical signal to the outside.

The collimate lens 120 is served to convert the optical signal outputted from the input waveguide 110 in the radial direction into parallel rays and then input the rays into the optical deflector element 130.

The optical deflector element 130 is served to change the propagating direction of the optical signal passing through the collimate lens 120. In this optical deflector element 130, two prism type electrodes 130a and 130b served as a lower electrode and a conductive substrate (not shown) served as an upper electrode apply a voltage onto a slab waveguide (not shown) made of a material having an electrooptical effect. This thus causes the refractive index inside the slab waveguide to be changed, thereby changing the propagating direction of the optical signal entered from the collimate lens 120 into the inside of the slab waveguide. In addition, the structure of this optical deflector element 130 will be discussed in detail with reference to FIG. 2.

The common waveguide 140 is composed of a slab waveguide and serves to convey the optical signal passing through the optical deflector element 130 to the light-condensing portion 150.

The light-condensing portion 150 includes a plurality of light-condensing lenses 151, 152, 153 and 154 integrally formed in a manner to correspond with the output waveguides 161 to 164 respectively. Each of the light-condensing lenses 151 to 154 serves to image the optical signal propagated from the optical deflector element 130 through the common waveguide 140 onto the corresponding output waveguides 161 to 164, respectively.

The optical switch 100 arranged as described above is operated as follows.

The optical signal entered into the input waveguide 110 is converted into parallel rays through the collimate lens 120 and then is put into the optical deflector element 130. The optical deflector element 130 causes the propagating direction of the entered optical signal to be optionally changed by controlling the voltage applied onto each prism type electrode and then to be entered into any one of the light-condensing lenses 151 to 154 of the light-condensing portion 150 through the common waveguide 140. The optical signal entered into each of the light-condensing lenses 151 to 154 is imaged and then entered into the corresponding one of the output waveguides 161 to 164 located on the outgoing side.

In the foregoing operation, therefore, the optical switch 100 allows the inputted optical signal of one channel to be outputted from any one of the output waveguides 161 to 164 by controlling the voltage applied onto the optical detector element 130.

The foregoing optical switch 100 is structured to have the optical deflector element 130 only on the outgoing side of the collimate lens 120 so that the optical signal propagated from the optical deflector element 130 through the common waveguide 140 may be directly entered into each of the light-condensing lenses 151 to 154 of the light-condensing portion 150. Hence, since the structure is simple and the number of the optical deflector elements 130 is small, the cost of parts is suppressed. Further, unlike the conventional optical switch, no optical deflector element is provided on the entrance side of the light-condensing portion 150. Hence, if the angles of deflection are the same in the optical deflector elements on the input side, the distance from these optical deflector elements to the light-condensing lenses on the output side is made shorter. This results in suppressing the size of the overall optical switch, thereby allowing the mounting space to be more efficiently used.

Further, the light-condensing portion 150 includes the light-condensing lenses integrally formed in a manner to correspond with the output waveguides 161 to 164 respectively. This type of light-condensing portion 150 has a simple structure and thus may be easily formed by the etching technique, for example, as will be discussed below. This makes it possible to suppress the manufacturing cost.

In turn, the description will be oriented to the example of the method of manufacturing the optical switch according to this embodiment.

The foregoing optical switch 100 is structured in such a manner that the input waveguide 110, the collimate lens 120, the common waveguide 140, the light-condensing portion 150, and the output waveguide portion 160 are integrally formed on a substrate made of quartz or the like and the optical deflector element 130 is mounted on this substrate.

Figure 2A:
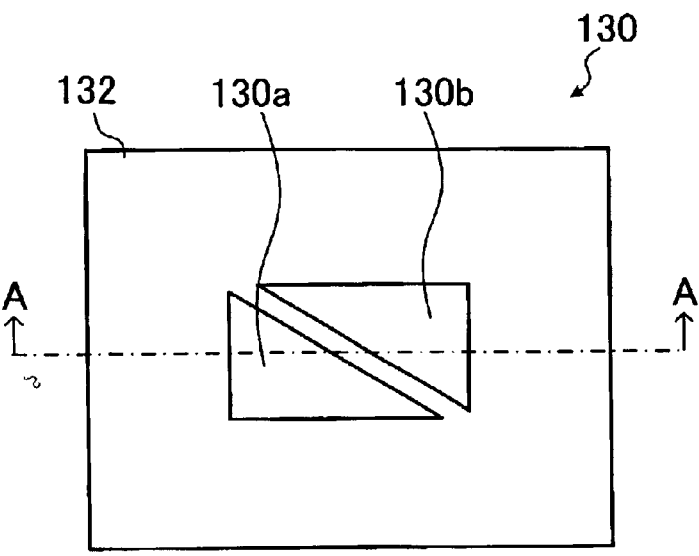
FIGS. 2A and 2B are views showing arrangements of an optical deflector element.
Figure 2B:
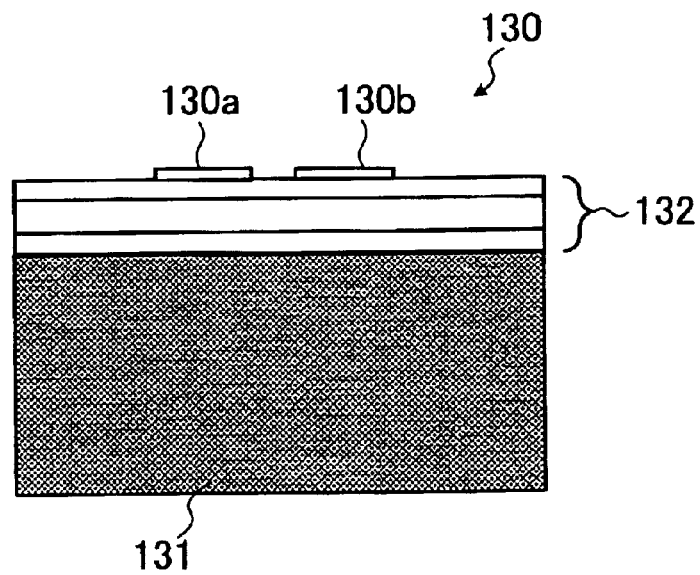

FIGS. 2A and 2B are views showing arrangements of the optical deflector element. FIG. 2A is a plan view showing the optical deflector element and FIG. 2B is a section cut on the A—A line of the plan view.

The optical deflector element 130 includes a slab waveguide 132 formed on a conductive substrate 131 and prism type electrodes 130a and 130b formed on the waveguide 132. The conductive substrate 131 is made by doping Nb into monocrystal of STO ($SrTiO_3$) having ferro-electricity for making the monocrystal material conductive. In the waveguide 132, PZT($Pb(Zr_yTi_{1-y}O_3)$) is used for making the core and PLZT($Pb_xLa_{1-x}(Zr_yTi_{1-y}O_3)$) is used for making the upper and the lower clads.

The slab waveguide 132 is heteroepitaxially grown on the conductive substrate 131 by means of the sol-gel technique, the PLD (Pulsed Laser Deposition) technique, the MOCVD (Metal Organic Chemical Vapor Deposition) technique or the like. As the materials of the waveguide 132, PZT, PLZT and PZT are laminated on the conductive substrate 131 in this describing sequence.

Afterwards, the triangular prism electrodes 130a and 130b are formed on the opposite plane of the slab waveguide 132 to the conductive substrate 131. The prism electrodes 130a and 130b are located in such a manner as allowing the hypotenuse of one electrode to be opposed to that of the other electrode. In the case of applying an in-phase voltage between the electrodes 130a, 130b and the conductive substrate 131, the prism electrodes 130a and 130b deflect the optical signal propagating through the slab waveguide 132 in one direction, while the conductive substrate 130 deflects the signal in the opposite direction. These prism electrodes 130a and 130b are composed by forming a metallic film with platinum or the like by means of the photolithography technique and the sputtering technique and then abrading the formed film to a predetermined size.

In the embodiment shown in FIG. 2, the two prism electrodes 130a and 130b are formed to have different deflecting directions from each other. In place, only one electrode may be formed. Or, a pair of two prism electrodes 130a and 130b may be ranged in the propagating direction of the optical signal. Further, in place of the conductive substrate 131, the similarly shaped prism electrodes may be located in a manner to sandwich the slab waveguide 132.

Turning back to FIG. 1, the description will be oriented to the process of forming the optical input waveguide 110, the collimate lens 120, the common waveguide 140, the light-condensing portion 150, and the output waveguide portion 160.

This process may be executed by the ordinary process of forming a waveguide. At first, there is formed a substrate on which those parts are to be integrally formed. The material of the substrate may be quartz or polymer. For the quartz, this substrate is also served as a lower clad of the slab waveguide formed thereon. On this substrate is formed a core with quartz having a refractive index enhanced by diffusing Ge in quartz. On the core is formed an upper clad with quartz. This core and the upper clad are formed by means of the MOCVD technique, for example. These series of processes result in forming a uniform slab waveguide on the substrate.

Then, a metallic film is formed as an etching mask on the surface of the upper clad by means of the photolithography technique and the sputtering technique. With this metallic film as a mask, the quartz is etched to form concaves by the RIE (Reactive Ion Etching) technique with a fluorine gas or the like, in which concaves the input waveguide 110, the output waveguides 161 to 164, the collimate lens 120, the light-condensing portion 150, and the optical deflector element 130 are to be mounted.

Herein, the light-condensing portion 150 includes light-condensing lenses 151 to 154 integrally formed therewith. The foregoing method allows this kind of light-condensing portion 150 to be easily formed by the conventionally known method.

Afterwards, on the bottom of the concave in which the optical deflector element 130 is to be mounted, electrodes are formed. The electrodes are served to connect with the prism electrodes 130a and 130b of the optical deflector element 130. These electrodes are formed by coating a resist on the bottom of the concave, patterning the bottom, laminating a titanium film by means of the sputtering technique, and then laminating a platinum film by means of the lift-off technique.

Then, in the resulting concave, the optical deflector element 130 is located in a manner to oppose the prism electrodes 130a and 130b to the substrate. At last, by positioning the waveguides with each other and connecting and bonding the opposed electrodes with solder bumps is completed the optical switch 100 according to this embodiment.

The aforementioned optical switch 100 is structured to mount the optical deflector element 130 only on the input side of the optical signal. This means that the concave for mounting the element 130 is just required to be formed only on the input side, which results in enhancing the manufacturing efficiency. Further, the light-condensing portion 150 having a group of light-condensing lenses 151 to 154 integrally formed therewith may be easily formed by the same method as the conventional one. Hence, in comparison with the conventional optical switch, the optical switch 100 of this embodiment may be more easily manufactured at less cost.

In turn, the description will be oriented to a transformation of the foregoing first embodiment.

Figure 3:
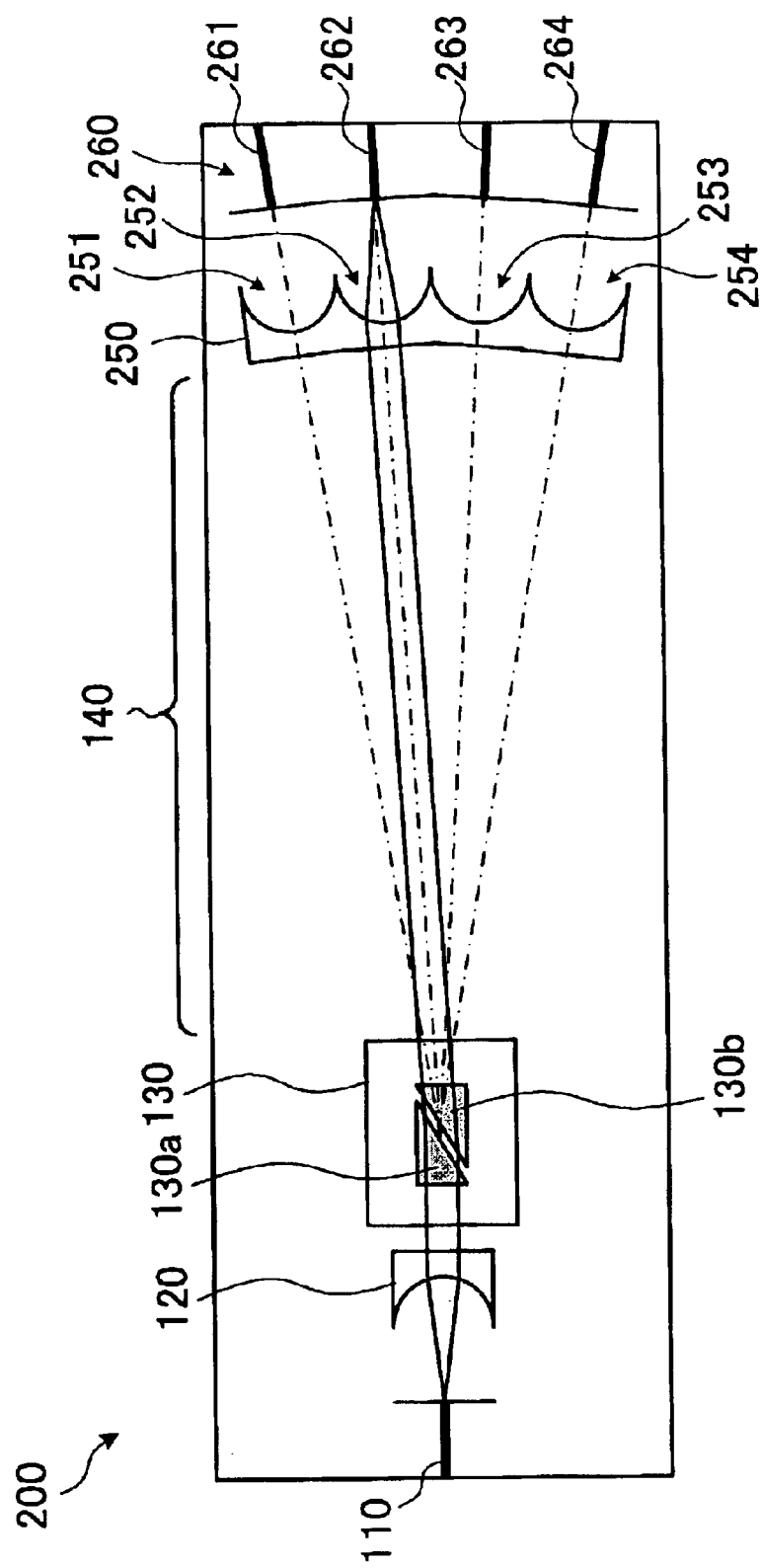
FIG. 3 is a plan view showing an overall arrangement of an optical switch according to a second embodiment of the present invention.

FIG. 3 is a plan view showing an overall arrangement of the optical switch according to a second embodiment of the present invention. In FIG. 3, the same components as those of the optical switch shown in FIG. 1 are given the same reference numbers. The description about those components is left out herein.

Like the optical switch shown in FIG. 1, the optical switch 200 shown in FIG. 3 is arranged to switch an optical signal of one input into signals of plural output channels. As one example, the optical switch 200 has a connection of one input to four output channels (1×4 input and output channels).

The basic arrangement of this optical switch 200 is similar to that of the first embodiment shown in FIG. 1. The optical switch 200 includes as basic components the optical input waveguide 110, the collimate lens 120, the optical deflector element 130, the common waveguide 140, a light-condensing portion 250, and an output waveguide portion 260.

Of these components, the input waveguide 110, the collimate lens 120, the optical deflector element 130, and the common waveguide 140 are the same as those shown in FIG. 1. Concretely, an optical signal enters into the input waveguide 110. Then, the optical signal outputted from the waveguide 110 is conveyed into the collimate lens 120 in which the signal is converted into parallel rays. Then, the parallel rays are entered into the optical deflector element 130. The optical deflector element 130 changes the propagating direction of the entered optical signal by adjusting the voltage to be applied onto the prism electrodes 130a and 130b. Then, the resulting optical signal is put into the common waveguide 140.

On the output side of the optical signal is provided the output waveguide portion 260 and the light-condensing portion 250. The output waveguide portion 260 is composed of output waveguides 261, 262, 263 and 264 for outputting an optical signal to the outside. The light-condensing portion 250 is composed of light-condensing lenses 251, 252, 253 and 254 for imaging an optical signal on the corresponding output waveguides 261 to 264. The group of light-condensing lenses 251 to 254 are integrally formed in the light-condensing portion 250.

The groups of light-condensing lenses 251 to 254 and of output waveguides 261 to 264 include their optical axes that are located in a manner to coincide with the optical axes of the optical signals outputted from the optical deflector element 130, respectively. That is, the optical axes of the light-condensing lenses 251 to 254 and the output waveguides 261 to 264 coincide with the radial direction from the center of deflection on the optical deflector element 130. Strictly, the center of deflection on the optical deflector element 130 may be variable depending on the deflecting direction and the voltage being applied onto the prism electrodes 130a and 130b. Roughly, this center of deflection may be regarded as the center of the mounted place of the prism electrodes 130a and 130b of the optical deflector element 130.

The foregoing location allows the optical signal outputted from the optical deflector element 130 to pass through the common waveguide 140 and then to be imaged through the light-condensing lenses 251 to 254, from which the optical signals are inputted into the corresponding output waveguides 261 to 264. At a time, the optical axis of the optical signal coincides with the optical axis of each of the light-condensing lenses 251 to 254 and the output waveguides 261 to 264. Hence, as compared with the optical switch 100 shown in FIG. 1, the optical switch 200 shown in FIG. 3 serves to optically couple the optical signal with the output waveguides 261 to 264 at a higher efficiency. As a whole, therefore, the optical switch 200 lowers its power loss.

This kind of optical switch 200 may be manufactured by the similar method to that of the optical switch 100 shown in FIG. 1. As in the case of FIG. 1, the light-condensing portion 250 and the output waveguide portion 260 may be easily formed by making an etching mask in a manner to allow each of the light-condensing lenses 251 to 254 and the output waveguides 261 to 264 to be correctly located as noted above and then etching the waveguide. Hence, the optical switch according to the second embodiment of the invention is smaller in size and manufactured at lower cost. Moreover, the optical switch presents higher propagation efficiency.

In turn, the description will be oriented to the optical switch module that realizes switch of connections between a plurality of groups of input and output channels by providing a plurality of optical switches each having a connection of 1×n input and output channels (one input to n output channels) (n is an integer of 2 or more).

Figure 4:
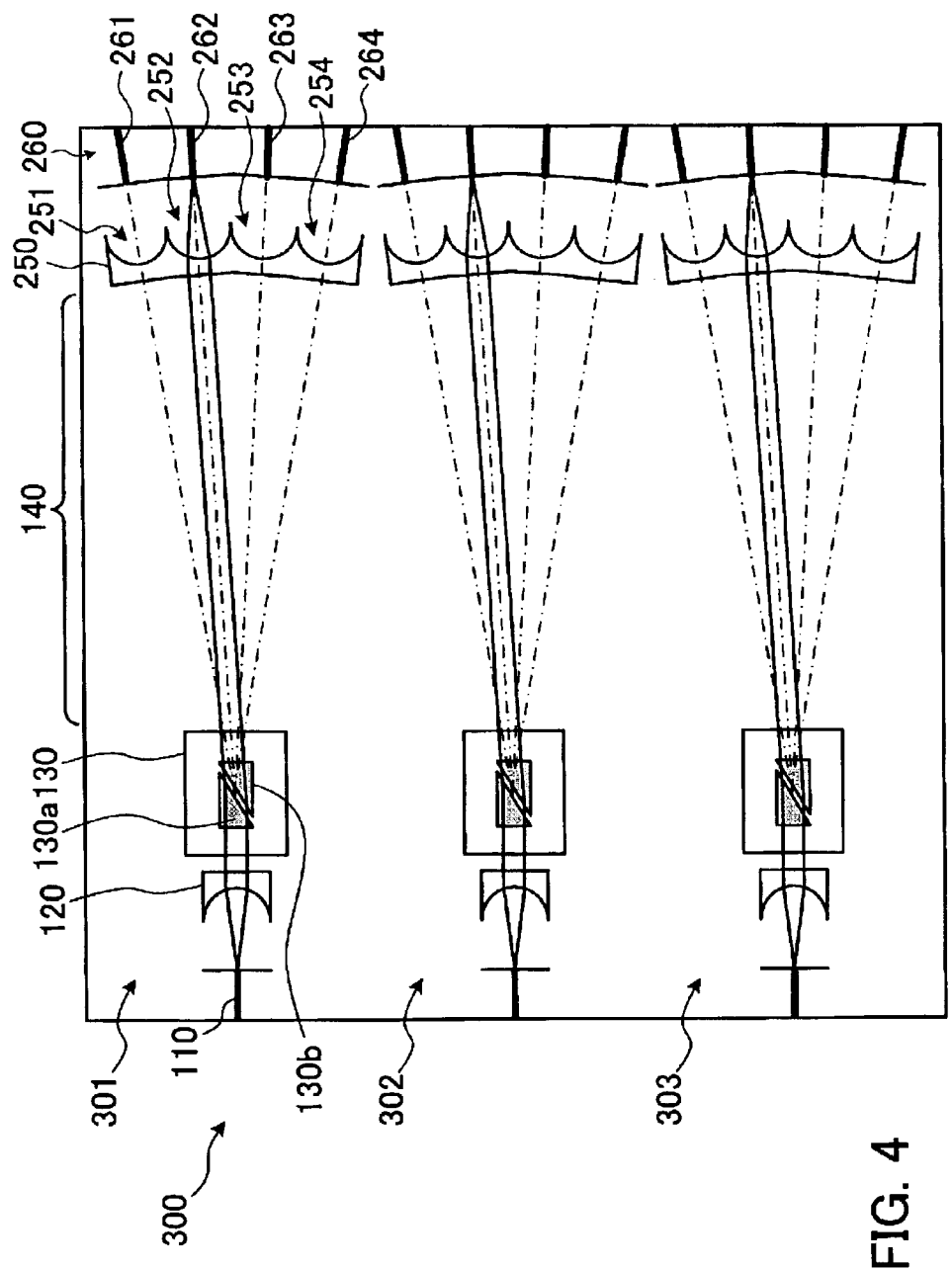
FIG. 4 is a plan view showing an overall arrangement of an optical switch module according to a third embodiment of the present invention.

FIG. 4 is a plan view showing an overall arrangement of an optical switch module according to a third embodiment of the present invention. In FIG. 4, the same components as those of the optical switch shown in FIG. 3 are given the same reference numbers. The description about those components is left out herein.

The optical switch module 300 shown in FIG. 4 includes three optical switches having the structure shown in FIG. 3 as an example. These optical switches 301, 302 and 303 are integrated on the same substrate. Since the optical switches 301 to 303 have the same structures as each other, the description will be limited to the arrangement of the optical switch 301.

Like the optical switch 200 shown in FIG. 3, the optical switch 301 serves to switch a connection of 1×4 input and output channels (that is, one input to four output channels). It includes the input waveguide 110, the collimate lens 120, the optical deflector element 130, the common waveguide 140, the light-condensing portion 250, and the output waveguide portion 260.

In this optical switch 301, the optical signal from the outside is inputted into the input waveguide 110. Then, the input waveguide 110 outputs the optical signal to the collimate lens 120 in which the optical signal is converted into parallel rays. The parallel rays are inputted into the optical deflector element 130. The optical deflector element 130 changes the propagating direction of the inputted optical signal by adjusting the voltage being applied onto the prism electrodes 130a and 130b and then outputs this optical signal to the common waveguide 140. The optical signal propagating through the common waveguide 140 is inputted into each of the light-condensing lenses 251 to 254 integrally formed in the light-condensing portion 250. The optical signal is imaged in each light-condensing lens. Then, the imaged optical signal from each light-condensing lens is inputted to the corresponding one of the output waveguides 261 to 264, from which the imaged optical signal is outputted.

The groups of light-condensing lenses 251 to 254 and of output waveguides 261 to 264 include their optical axes that are located in a manner to coincide with the axes of the optical signals outputted from the optical deflector element 130, respectively. This kind of location allows the optical signals outputted from the optical deflector element 130 to pass through the corresponding light-condensing lenses 251 to 254 and then to be optically coupled with the corresponding output waveguides 261 to 264 as keeping its loss low.

The foregoing optical switch 301 serves to switch a connection of 1×4 input and output channels (one input to four output channels). The optical switch module includes three optical switches 301 to 303 ranged in parallel, each of those switches having the same arrangement. Each of the optical signals from three input channels is distributed into four output channels. This optical switch module provides no optical deflector element on the entrance side of the light-condensing portion 250. Hence, the module has a simple structure. It means that the cost of the parts is greatly reduced. The length of the propagating direction of the optical signal is suppressed, so that the overall module may be reduced in size.

The foregoing third embodiment has been arranged to range in parallel the optical switches each of which is structured as shown in FIG. 3. In place, for example, the optical switch module may be realized by ranging in parallel the optical switches each of which is structured as shown in FIG. 1. In this case, however, the propagation efficiency is made lower.

The optical switch module 300 shown in FIG. 4 is often used for switching the optical signals from a plurality of input channels to the output channels at a batch. Herein, the term "switching . . . at a batch" means that n combinations of waveguides each having m output channels corresponding with each of m (m is an integer of 2 or more) channels on the input side are installed and the optical signals inputted to m input channels are outputted into any combination of waveguides at a batch.

Figure 5:
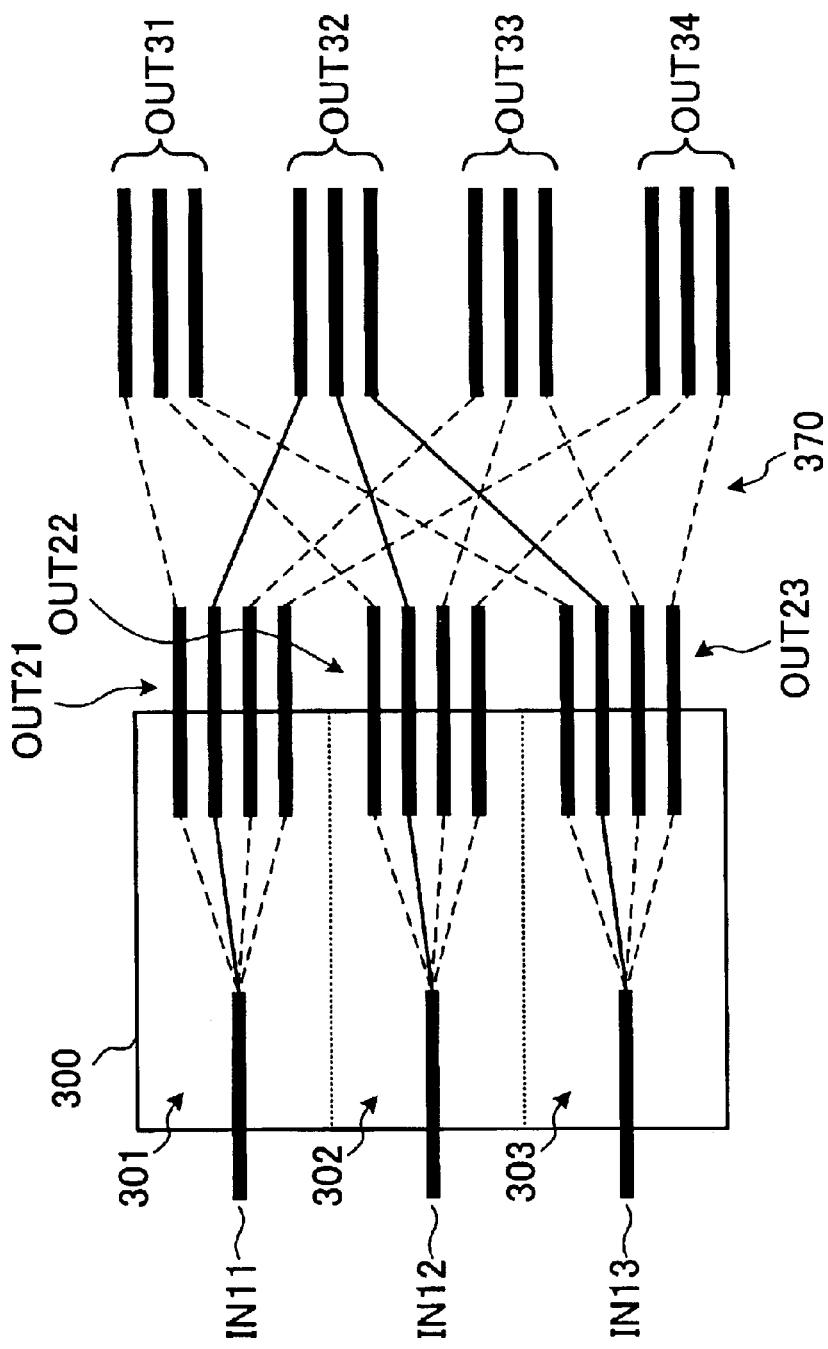
FIG. 5 is a diagram showing an arrangement provided in converting a plurality of input channels at a batch.

FIG. 5 is a model view showing an arrangement provided in switching a plurality of input channels at a batch.

In the arrangement shown in FIG. 5, the optical signals from three input channels IN11, IN12 and IN13 are switched into four output systems OUT31, OUT32, OUT33 and OUT34 at a batch. In FIG. 5, the optical signals from the input channels IN11 to IN13 are inputted into the optical switch module 300. As shown in FIG. 4, this optical switch module 300 includes a group of optical switches 301 to 303 ranged in parallel. Each optical switch has a connection of 1×4 (one input to four output) channels. Each four output channels included in each of the optical switches 301 to 303 is referred to as OUT21, OUT22 and OUT23. In addition, FIG. 5 schematically shows only a propagating path of the optical signal. It does not show the structure of each of the optical switches 301 to 303.

On the outgoing side of the optical switch module 300 is located an optical wire rearranging portion 370. This rearranging portion 370 is served to couple each of the waveguide output systems OUT21 to OUT23 of the optical switch module 300 with each of the final waveguide output systems OUT31 to OUT34. Herein, each of the output systems OUT31 to OUT33 is connected with each one waveguide of the output systems OUT21 to OUT23 of the optical switches 301 to 303. That is, the first channel of each of the output systems OUT21 to OUT23 is connected with the channels of the output system OUT31. Likewise, each second channel of the output systems OUT21 to OUT23 is connected with the output system OUT32, the third channel is connected with the output system OUT33, and the fourth channel is connected with the output system OUT34.

In the foregoing arrangement, when each of the optical switches 301 to 303 switches the path, the optical switch is served to switchably connect with the same channel in each of the output systems OUT21 to OUT23. For example, when the optical switch 301 switches the channel to the first channel of the output system 21, the other optical switches 302 and 303 switch the channel to the first channel of each of the output systems 22 and 23. This switching operation allows the optical signals from three input channels IN11 to IN13 to be switchably outputted to any one of the output systems 31 to 34.

This kind of arrangement requires the optical wire rearranging portion 370 between the optical module 300 and the waveguides of the final output systems OUT31 to OUT34. Hence, the need for reducing the optical switch module 300 in size is on the rise. By applying the optical switch shown in FIGS. 1 and 3 into the optical switch module 300, the length of the propagating direction of the optical signal is suppressed and the overall unit may be reduced in size.

In turn, the description will be oriented to the optical switch that is arranged to switch the paths of the optical signals from input channels, the optical switch being arranged by providing a plurality of optical deflector elements in the optical switch shown in FIG. 1.

Figure 6:
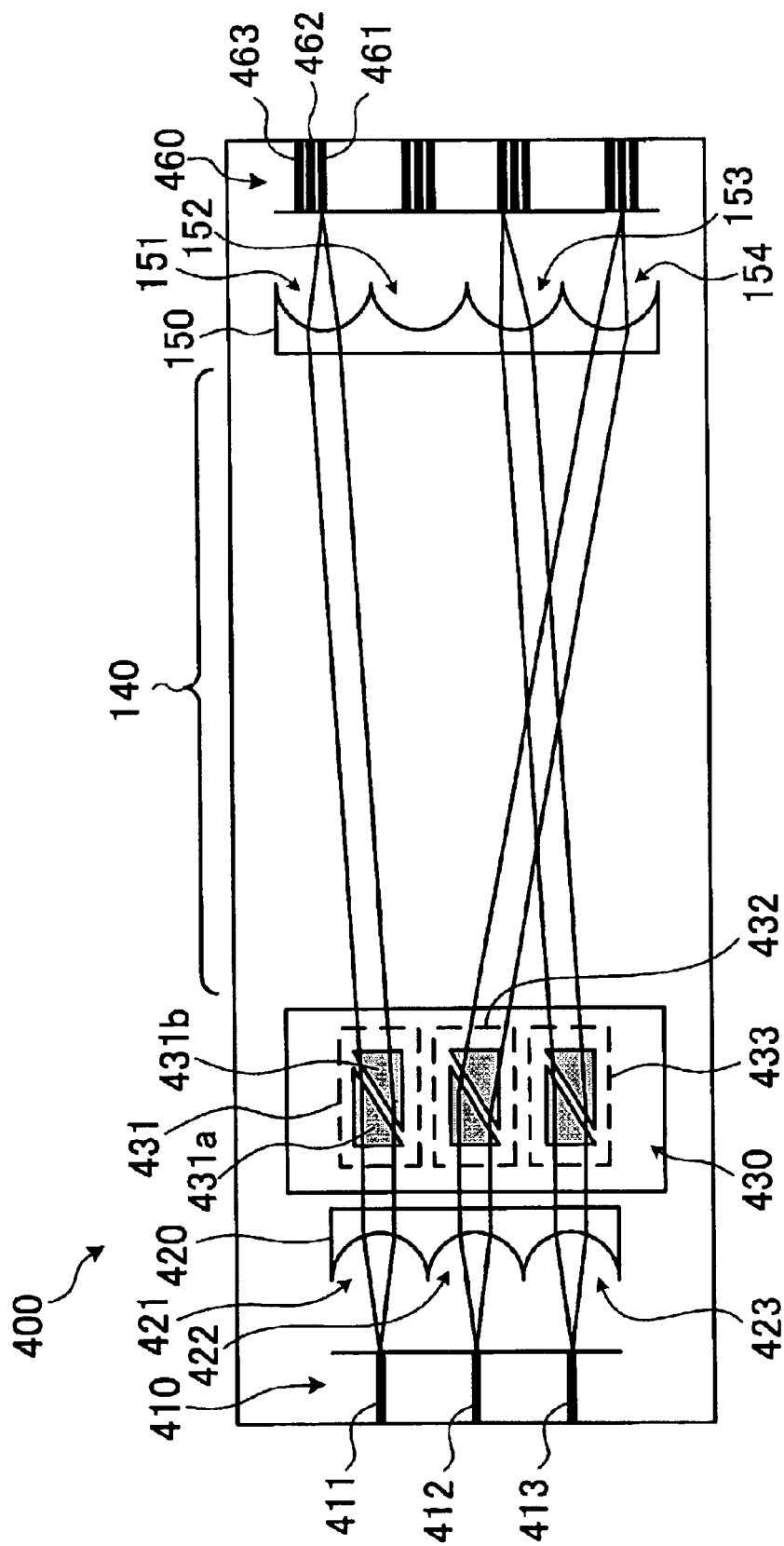
FIG. 6 is a plan view showing an overall arrangement of an optical switch according to a fourth embodiment of the present invention.

FIG. 6 is a plan view showing an overall arrangement of an optical switch according to a fourth embodiment of the present invention. The same components shown in FIG. 6 as those of the optical switch shown in FIG. 1 are given the same reference numbers. The description about those components is left out herein.

The optical switch 400 shown in FIG. 6 includes an input waveguide portion 410, a collimate portion 420, an optical deflector element portion 430, the common waveguide 140, the light-condensing portion 150, and an output waveguide portion 460.

The input waveguide portion 410 includes a group of input waveguides 411, 412 and 413 formed for the corresponding input channels. An optical signal is inputted from the outside to each of the input waveguides 411 to 413. The collimate portion 420 includes a group of collimate lenses 421, 422 and 423 integrally formed for the corresponding input waveguides 411 to 413. The collimate lenses 421 to 423 convert the rays outputted radially from the input waveguides 411 to 413 into the parallel rays and then input the parallel rays into the optical deflector element portion 430.

The optical deflector element portion 430 includes optical deflector elements 431, 432 and 433 formed for the corresponding input channels. The basic arrangement of each of the optical deflector elements 431 to 433 is the same as the optical deflector element provided in the optical switch shown in FIG. 1. Herein, as a representative element, only the optical deflector element 431 will be described. In this optical deflector element 431, two prism type electrodes 431a and 431b served as a lower electrode and a conductive substrate (not shown) served as an upper electrode apply a voltage onto a slab waveguide (not shown) made of a material having an electrooptical effect. This thus causes the refractive index inside the slab waveguide to be changed, thereby changing the propagating direction of the optical signal entered from the collimate lens 120 into the inside of the slab waveguide.

The optical deflector element portion 430 may have the slab waveguide formed as a component of the optical deflector elements 431 to 433 and the conductive substrate formed as a common member. In this case, by forming on the common conductive substrate the upper and the lower clads and the core with PLZT, PZT and the like and then forming a film of the prism electrode provided in each of the optical deflector elements 431 to 433 on the upper clad at a stroke, it is possible to easily form the optical deflector element portion 430 integrally provided with the optical deflector elements 431 to 433.

The optical signal outputted from each of the optical deflector elements 431 to 433 is propagated through the common waveguide 140 and then is inputted into the light-condensing portion 150. The light-condensing portion 150 includes four light-condensing lenses 151 to 154 formed integrally therein. Each of the light-condensing lenses is served to image the optical signal propagated from the optical deflector element 130 through the common waveguide 140 onto the corresponding one of the output waveguides included in the output waveguide portion 460, through which the-optical signal is outputted.

The optical signals propagated from the optical deflector elements 431 to 433 are entered into the light-condensing lenses 151 to 154 at their own angles of incidence, respectively. Hence, these optical signals are imaged at respective positions through the light-condensing lenses 151 to 154. This requires the optical switch 400 to locate the output waveguide at each imaged position of the optical signals propagated from the optical deflector elements 431 to 433 on the outgoing side of each of the light-condensing lenses 151 to 154. For example, on the outgoing side of the light-condensing lens 151 is located three output waveguides 461, 462 and 463. That is, each group of three output waveguides corresponding with each of the optical deflector elements 431 to 433 is located on the outgoing side of each of the light-condensing lenses 151 to 154. It means that totally 12 output waveguides are provided in the output waveguide portion 460.

The optical switch 400 arranged as described above may independently pick up the optical signal outputted from each of the optical deflector elements 431 to 433 on the outgoing side of each of the light-condensing lenses 151 to 154. For example, the optical signals, propagated from the optical deflector elements 431 to 433 to the corresponding light-condensing lens 151, are inputted into the output waveguides 461 to 463, from which the optical signals are individually outputted.

The foregoing optical switch 400 is structured to have the optical deflector elements 431 to 433 only on the outgoing side of the collimate portion 420 so that the optical signals outputted from these optical deflector elements are propagated through the common waveguide 140 and then are directly inputted into the light-condensing lenses 151 to 154 included in the light-condensing portion 150. The light-condensing lenses 151 to 154 may be also used by the optical deflector elements 431 to 433 on the input side. Hence, the structure is simple, the manufacturing efficiency becomes higher, and the number of the optical deflector elements is small. These thus result in lowering the cost of the parts. Further, unlike the prior art, no optical deflector element is provided on the entrance side of the light-condensing portion. Thus, if the optical deflector elements located on the input side have the same angle of deflection, the distance between the optical deflector elements and the light-condensing lenses is made shorter. This thus makes it possible to reduce the optical switch 400 in size.

Further, the light-condensing portion 150 includes a group of light-condensing lenses 151 to 154 integrally formed therein. The collimate portion 420 includes a group of collimate lenses 421 to 423 integrally formed therein. The light-condensing portion 150 and the collimate portion 420 may be easily formed by means of the etching or the like. This thus makes it possible to realize the foregoing effect without raising the manufacturing cost.

Figure 7:
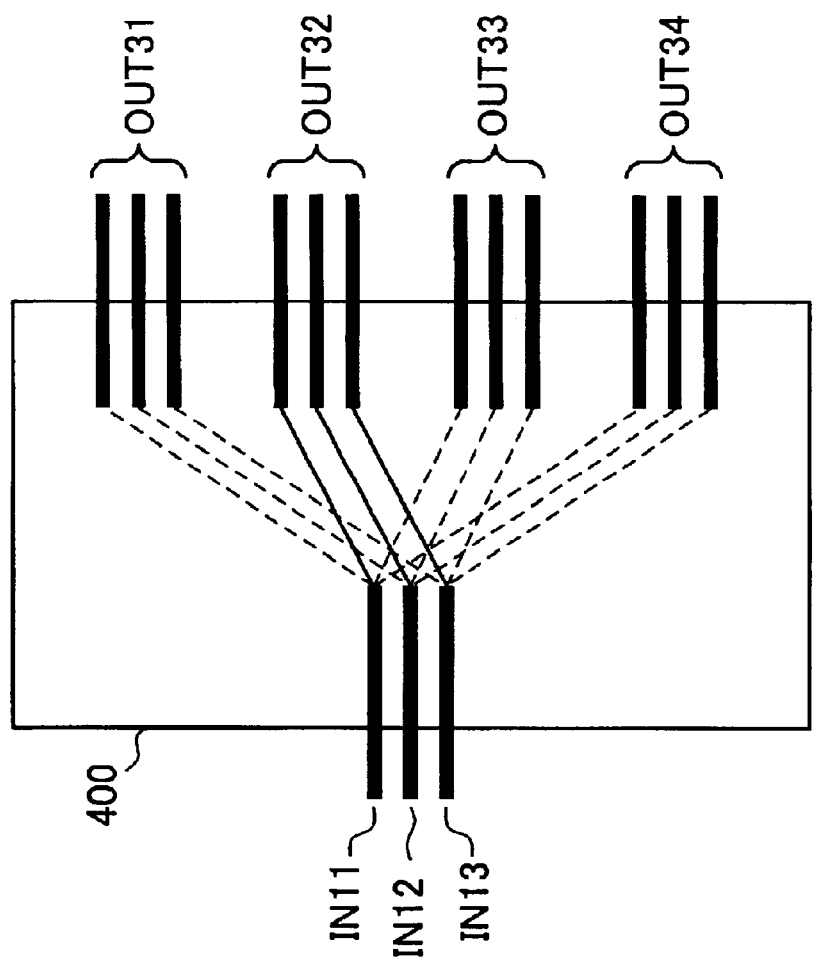
FIG. 7 is an explanatory view for explaining conversion of a plurality of input channels at a batch through the use of the optical switch according to the fourth embodiment of the present invention.

This optical switch 400 may be used for switching of input channels at a batch as shown in FIG. 5. FIG. 7 is a view for explaining the switch of input channels at a batch through the use of the optical switch 400.

FIG. 7 schematically shows the switch of connections of the input and output channels in the optical switch 400. In FIG. 7, the optical switch 400 includes three input channels IN11, IN12 and IN13 respectively for the input waveguides 412 to 413. On the output side are provided four output systems OUT31, OUT32, OUT33 and OUT34, each of which has three channels. That is, the totally 12 output channels included in the output systems OUT31 to OUT34 correspond with the output waveguides included in the output waveguide portion 460, respectively.

In this optical switch 400, the input channel IN11 may be connected with each first channel of the output systems OUT31 to OUT34. Likewise, the input channel IN12 is connected with each second channel of the output systems OUT31 to OUT34 and the input channel IN13 is connected with each third channel thereof. The optical switch 400 therefore enables to switch all optical signals of the inputted channels at a batch by inevitably connecting all optical signals of the input channels IN11 to IN13 with one of the output systems OUT31 to OUT34.

If the switch of the channels at a batch is executed in the arrangement shown in FIG. 5, it is necessary to provide an optical wire rearranging portion between the optical switch module 300 and the output waveguides that correspond to the final output channels. However, the switch of the channels at a batch through the use of the optical switch according to this embodiment does not need to locate the optical wire rearranging portion at an output stage as shown in FIG. 7. Hence, as the structure is made simpler and the manufacturing efficiency is made higher, the element size may be greatly reduced. It means that the optical switch according to this embodiment is suitable to the switch of inputted optical signals at a batch.

In turn, the description will be oriented to a transformation of the foregoing fourth embodiment.

Figure 8:
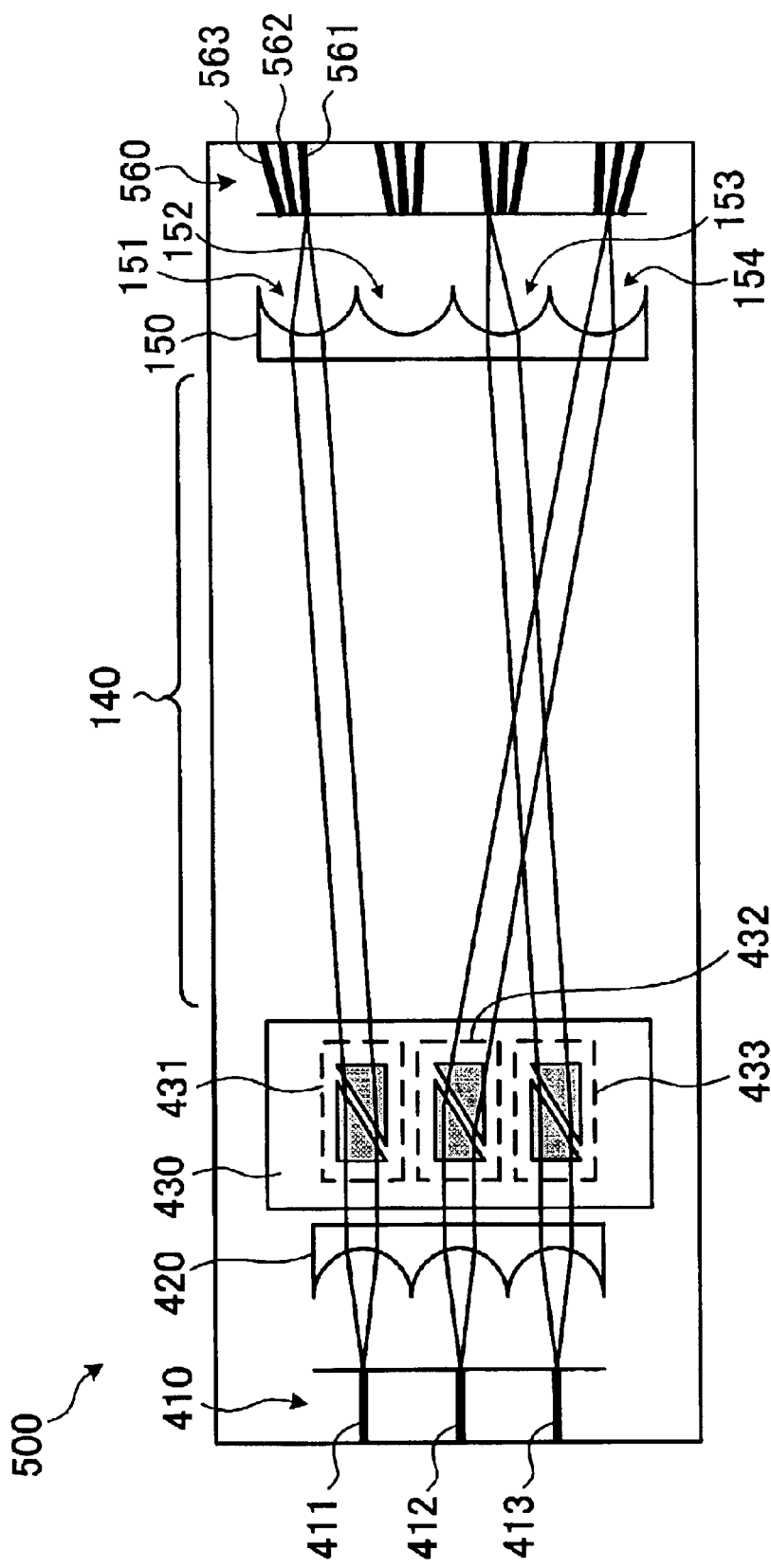
FIG. 8 is a plan view showing an overall arrangement of an optical switch according to a fifth embodiment of the present invention.

FIG. 8 is a plan view showing an overall arrangement of an optical switch according to a fifth embodiment of the present invention. In FIG. 8, the same components as those of the optical switch shown in FIG. 6 are given the same reference numbers as those in FIG. 6. The description about those components is left out herein.

The basic arrangement of the optical switch 500 shown in FIG. 8 is the same as that of the optical switch shown in FIG. 6. It includes the input waveguide portion 410, the collimate portion 420, the optical deflection element portion 430, the common waveguide 140, the light-condensing portion 150, and an output waveguide portion 560. Of those components, the input waveguide portion 410, the collimate portion 420, the optical deflector element portion 430, the common waveguide 140, and the light-condensing portion 150 are the same as those shown in FIG. 6.

That is, the optical signal from the outside is inputted into each of the input waveguides 411 to 413 included in the input waveguide portion 410, from which waveguides the optical signals are inputted into the collimate lenses 421 to 423 included in the collimate portion 420. The lenses 421 to 423 convert the optical signals into the parallel rays. The parallel rays are inputted into the optical deflector elements 431 to 433 included in the optical deflector element portion 430. The optical deflector elements 431 to 433 change the propagating direction of the inputted optical signals by adjusting the voltage to be applied onto each prism electrode so that the optical signals may be entered into the light-condensing lenses 151 to 154 included in the light-condensing portion 150 through the common waveguide 140. Since the optical signals from the optical deflector elements 431 to 433 are entered into the light-condensing lenses 151 to 154 at respective angles of incidence, the lenses 151 to 154 image the optical signals at their corresponding positions. Hence, the output waveguide portion 560 provides totally 12 output waveguides, three waveguides for each group of four light-condensing lenses 151 to 154.

In this optical switch 500, the output waveguide portion 560 is located in a manner to allow the optical axis of each output waveguide to coincide with the optical axis of the optical signal outputted from the corresponding one of the light-condensing lenses 151 to 154. For example, on the outgoing side of the light-condensing lens 151, the optical axis of the output waveguide 561 coincides with the optical axis of the optical signal propagated from the optical deflector element 431 through the light-condensing lens 151, the optical axis of the output waveguide 562 coincides with the optical axis of the optical signal propagated from the optical deflector element 432 through the light-condensing lens 151, and the optical axis of the output waveguide 563 coincides with the optical axis of the optical signal propagated from the optical deflector element 433 through the light-condensing lens 151. As compared with the fourth embodiment shown in FIG. 6, therefore, the optical switch 500 of this embodiment has a higher coupling efficiency of an optical signal against each output waveguide. The optical switch 500 thus lowers a loss of the optical signal caused by the switch of connections.

Figure 9:
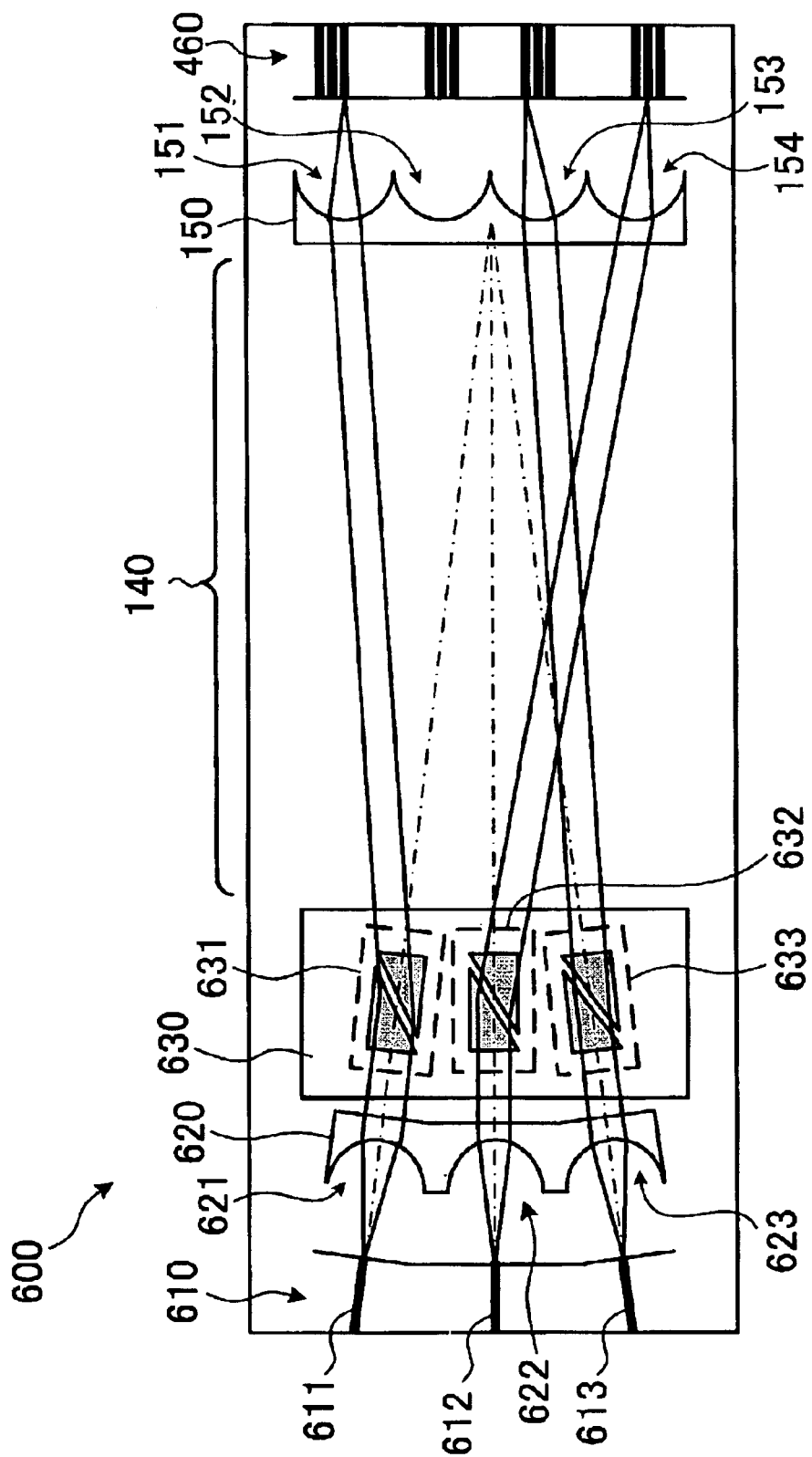
FIG. 9 is a plan view showing an overall arrangement of an optical switch according to a sixth embodiment of the present invention.

In turn, the description will be oriented to a second transformation of the optical switch according to the fourth embodiment of the present invention. FIG. 9 is a plan view showing an overall arrangement of an optical switch according to a sixth embodiment of the present invention. In FIG. 9, the same components as those of the optical switch shown in FIG. 6 are given the same reference numbers. The description about those components is left out herein.

The basic arrangement of the optical switch 600 shown in FIG. 9 is the same as that of the optical switch shown in FIG. 6. It includes an input waveguide portion 610, a collimate portion 620, an optical deflector element portion 630, the common waveguide 140, the light-condensing portion 150, and the output waveguide portion 460, the latter three of which are the same as those shown in FIG. 6.

In the optical switch 600, the input waveguide portion 610 includes input waveguides 611 to 613. The collimate portion 620 includes collimate lenses 621 to 623 corresponding with the input waveguides 611 to 613 respectively. The optical deflector element portion 630 includes optical deflector element 631 to 633. The optical axes of the input waveguide 611, the collimate lens 621 and the optical deflector element 631 coincide with one another and extend to the substantially center of the light-condensing portion 150. So are the optical axes of the input waveguide 612, the collimate lens 622 and the optical deflector element 632 and the optical axes of the input waveguide 613, the collimate lens 623 and the optical deflector element 633. These three groups of the optical axes are located radially as viewed from the substantially center of the light-condensing portion 150. It is preferable that each group of optical axes may pass through the center of a tangent against each surface of the light-condensing lenses 151 to 154.

The optical switch 600 arranged as described above is different from the optical switch shown in FIG. 6 in the following respects. At first, assuming that the former switch 600 has the same distance between the center of the optical deflector element and the light-condensing lens as the latter switch, in the optical switch 600 of this embodiment, all optical deflector elements 631 to 633 have the substantially uniform angles of deflection horizontally with respect to the optical axis (vertically in the view), those angles of deflection at which the optical signal is entered into four light-condensing lenses 151 to 154. Hence, as compared with the optical switch shown in FIG. 6, the maximum angle of deflection (absolute value) required in each of the optical deflector elements 631 to 633 is made smaller, so that the voltage to be applied onto the optical deflector element portion 630 may be reduced for suppressing the power consumption. In place, each prism electrode provided in the optical deflector elements 631 to 633 is small in area, which leads to reducing the optical deflector element portion 630 in size.

Conversely, if the voltage required for the optical switch shown in FIG. 6 is applied to the optical deflector element portion 630 included in the optical switch 600, the angle of deflection of each optical deflector element 631 to 633 is larger than required. Hence, the distance between the optical deflector element portion 630 and the light-condensing portion 150 may be reduced, which also leads to reducing the overall optical switch 600 in size. In this case, since the maximum angle of incidence against each light-condensing lens 151 to 154 is made larger, it is preferable to make the optical axis of the output waveguide coincide with the optical axis of the optical signal outputted from the light-condensing lens like the optical switch shown in FIG. 8.

In turn, the description will be oriented to a transformation of the optical switch according to the fourth, the fifth, or the sixth embodiment. This transformation of the optical switch operate to synthesize the output signals of the output waveguides corresponding with the light-condensing lenses and then output the synthesized signal. As an example, the below-discussed optical switch is an arrangement of the fifth embodiment shown in FIG. 8 additionally provided with that operation.

Figure 10:
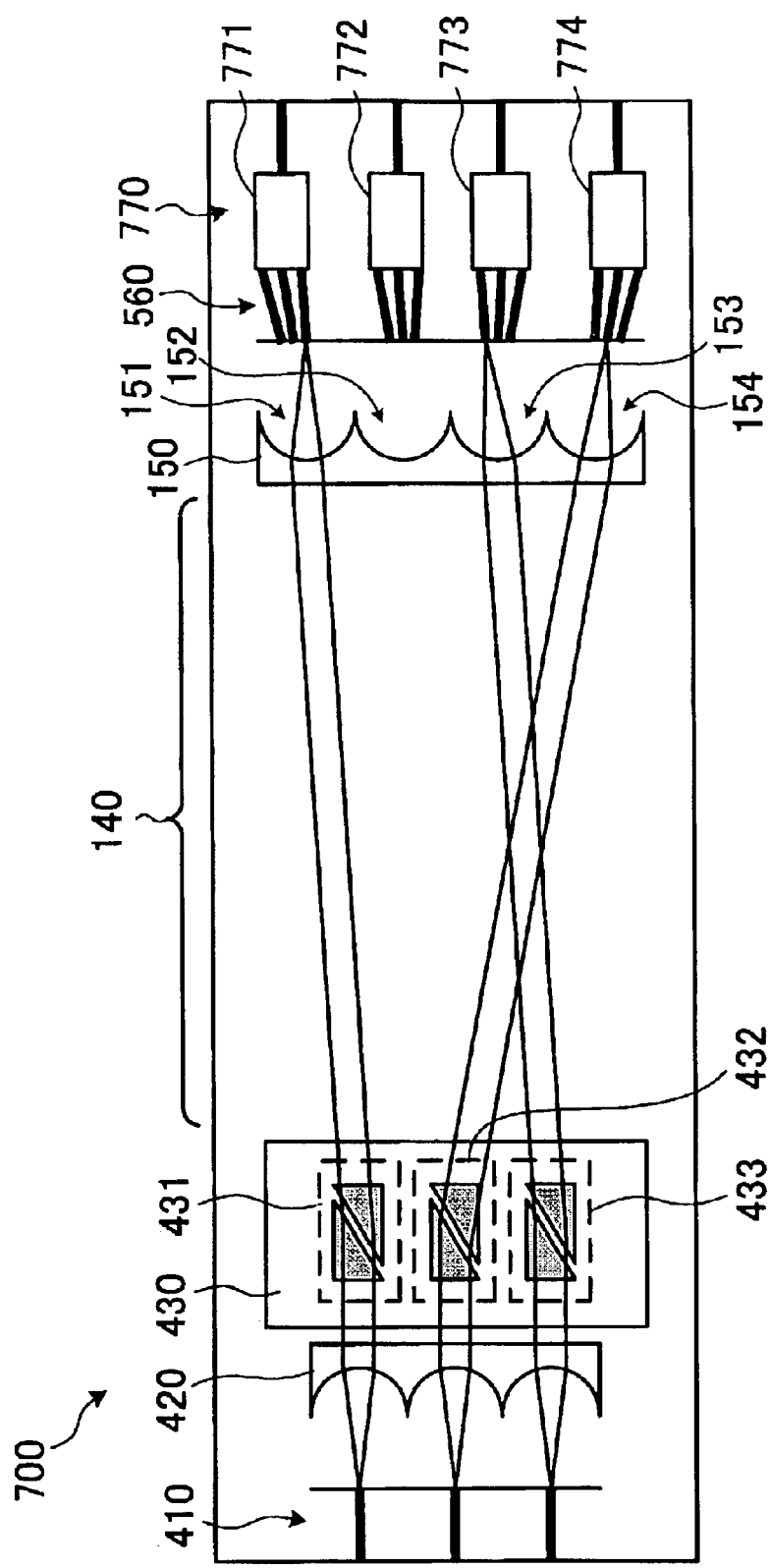
FIG. 10 is a plan view showing an overall arrangement of an optical switch according to a seventh embodiment of the present invention.
Figure 11:
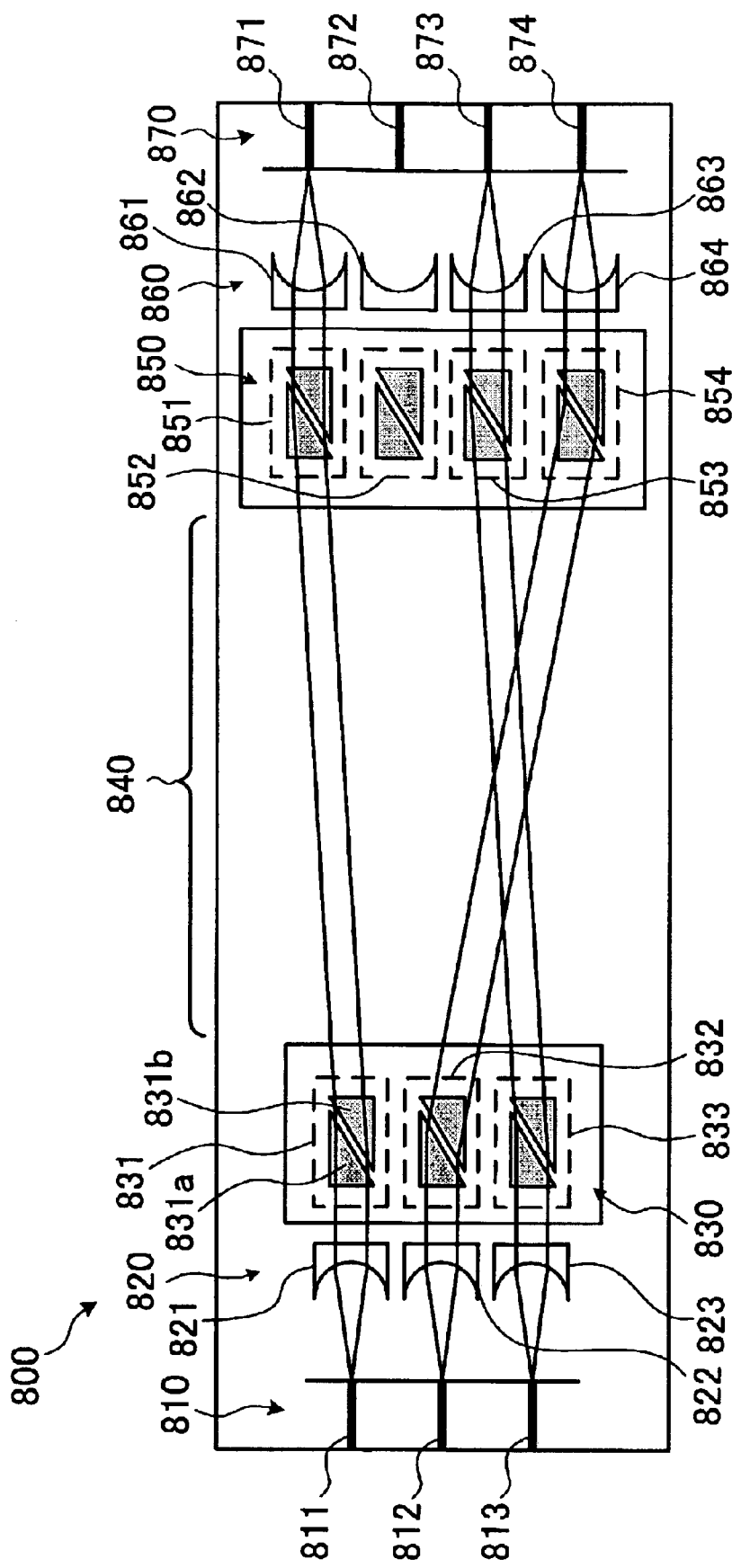
FIG. 11 is a view showing an arrangement of a conventional optical switch provided with an optical deflector element.

FIG. 10 is a plan view showing an overall arrangement of an optical switch according to a seventh embodiment of the present invention. In FIG. 10, the same components as those of the optical switch shown in FIG. 8 are given the same reference numbers. The description about those components is left out herein.

The optical switch 700 shown in FIG. 10 additionally provides a synthesizing portion 770 at the output stage of the optical switch shown in FIG. 8. This synthesizing portion 770 includes four synthesizers 771, 772, 773 and 774 corresponding with the light-condensing lenses 151 to 154 of the light-condensing portion 150.

In this optical switch 700, the optical signal inputted from the optical deflector elements 431 to 433 are imaged at respective positions through the light-condensing lenses 151 to 154, at which positions the output waveguides are located. Hence, on the outgoing sides of the light-condensing lenses 151 to 154, four groups of three output waveguides are located. The synthesizers 771 to 774 are located on the output sides of the groups of three output waveguides. Each synthesizer optically couples the rays of every three waveguides sharing the light-condensing lenses 151 to 154 on the entrance side and then outputs the coupled ray to one output waveguide. As the synthesizers 771 to 774 are used a branch waveguide like a Y-branch waveguide, a directivity coupler, a multimode interference synthesizer, or the like.

The optical switch 700 arranged as described above realizes a simple switching operation of connecting a plurality of input channels into a plurality of output channels. The foregoing branch waveguide, directivity coupler, and multimode interference synthesizer, all of which may be applied to the synthesizers 771 to 774 as described above, may be formed by a simple method of forming a necessary mask pattern on the waveguide formed on the substrate and then etching the waveguide. Hence, this embodiment may realize the simply structured optical switch to be manufactured at high efficiency.

As set forth above, the optical switch according to the present invention includes the integrally formed light-condensing lenses for imaging the optical signals onto the output waveguides in an independent manner. This kind of light-condensing lenses are easily formed by etching the waveguide formed on the substrate. Further, the optical deflector element is provided only on the outgoing side of the collimate lens. No optical deflector element is provided on the entrance side of each light-condensing lens. The optical switch may be thus arranged to have a simple structure and make the length in the propagating direction of the optical signal shorter and be manufactured with ease.

Further, the optical switch according to the present invention includes a plurality of collimate lenses for collimating the optical signals and a plurality of collimate lenses for imaging the optical signals, both of which are integrally formed therein. The collimate portion and light-condensing portion are easily formed by etching the waveguide formed on the substrate, for example. The optical deflector element is located only on the outgoing side of each collimate lens, while no optical deflector element is located on the entrance side of each light-condensing lens. Hence, the resulting optical switch may be arranged to have a simple structure and make the length in the propagating direction of the optical signal shorter and thus be manufactured with ease.

The foregoing is considered as illustrative only of the principles of the present invention. Further, since numerous modifications and changes will readily occur to those skilled in the art, it is not desired to limit the invention to the exact construction and application shown and described, and accordingly, all suitable modifications and equivalents may be regarded as falling within the scope of the invention in the appended claims and their equivalents.

What is claimed is:

1. An optical switch for switching a propagating path of an optical signal, comprising:

an input waveguide for accepting said optical signal inputted from the outside;

a plurality of output waveguides for outputting said optical signal to the outside;

a collimate portion for collimating said optical signal passed through said input waveguide;

an optical deflector element for switching a propagating direction of said optical signal passed through said collimate portion;

a common waveguide through which said optical signal passed through said optical deflector element is propagated; and a light-condensing portion having a plurality of light-condensing lenses integrally formed therein, each of said lenses serving to image said optical signal passed through said common waveguide onto each of said output waveguides.

2. The optical switch according to claim 1, wherein said optical deflector element includes a slab waveguide composed of a material having an electrooptical effect; and a pair of electrodes located vertically in a manner to sandwich an optical signal passing area of said slab waveguide, at least one of said electrodes being composed of one or more prism electrodes.

3. The optical switch according to claim 1, wherein each of said light-condensing lenses included in said light-condensing portion and each of said output waveguides include their optical axes that are located in a manner to coincide with the optical signal of said optical signal outputted from said optical deflector element.

4. An optical switch module for switching a propagating path of an optical signal, said module including a plurality of optical switches ranged and integrated therein, said optical switch comprising:

an input waveguide for accepting said optical signal inputted from the outside;

a plurality of output waveguides for outputting said optical signal to the outside;

a collimate portion for collimating said optical signal passed through said input waveguide;

an optical deflector element for switching a propagating direction of said optical signal passed through said collimate portion;

a common waveguide through which said optical signal passed through said optical deflector element is propagated; and a light-condensing portion having a plurality of light-condensing lenses integrally formed therein, each of said lenses serving to image said optical signal passed through said common waveguide onto each of said output waveguides.

5. The optical switch module according to claim 4, wherein in said optical switch each of said light-condensing lenses included in said light-condensing portion and each of said output waveguides include their optical axes that are located in a manner to coincide with the optical axis of said optical signal outputted from said optical deflector element.

6. An optical switch for switching a propagating path of an optical signal, comprising:

m input waveguides (m is an integer of 2 or more) for accepting said optical signal inputted from the outside;

a collimate portion having a plurality of collimate lenses integrally formed therein, each of said lenses serving to collimate said optical signal passed through each of said input waveguides;

a plurality of optical deflector elements for switching a propagating direction of said optical signal passed through each of said collimate lenses;

a common waveguide through which said optical signal passed through each of said collimate lenses is propagated;

a light-condensing portion having n light-condensing lenses (n is an integer of 2 or more) integrally formed therein, each of said lenses serving to image said each optical signal outputted from each of said optical deflector elements through said common waveguide; and m×n output waveguides located at all positions at which said optical signal propagated from each of said optical deflector element through said common waveguide is imaged through each of said light-condensing lenses, each of said output waveguides serving to output said incident optical signal to the outside.

7. The optical switch according to claim 6, wherein said optical deflector element includes a slab waveguide composed of a material having an electrooptical effect; and a pair of electrodes located vertically in a manner to sandwich an optical signal passing area of said slab waveguide, at least one of said electrodes being composed of one or more prism electrodes.

8. The optical switch according to claim 6, wherein each of said output waveguides includes its optical axis that is located in a manner to coincide with an optical axis of said optical signal inputted from each of said light-condensing lenses.

9. The optical switch according to claim 6, wherein said each input waveguide, said each collimate lens included in said collimate portion, and said each optical deflector element are located so that the optical axes of said each input waveguide and said each collimate lens may coincide with the optical axis of said optical signal propagated through said each optical deflector element at an angle of deflection of zero (0) in the radial direction from the center of said light-condensing portion.

10. The optical switch according to claim 6, further comprising n synthesizers for synthesizing said optical signals propagated through every m output waveguides located on the outgoing side of said each light-condensing lens and then outputting said synthesized signal.

* * * * *